UNITED STATES PATENT OFFICE.

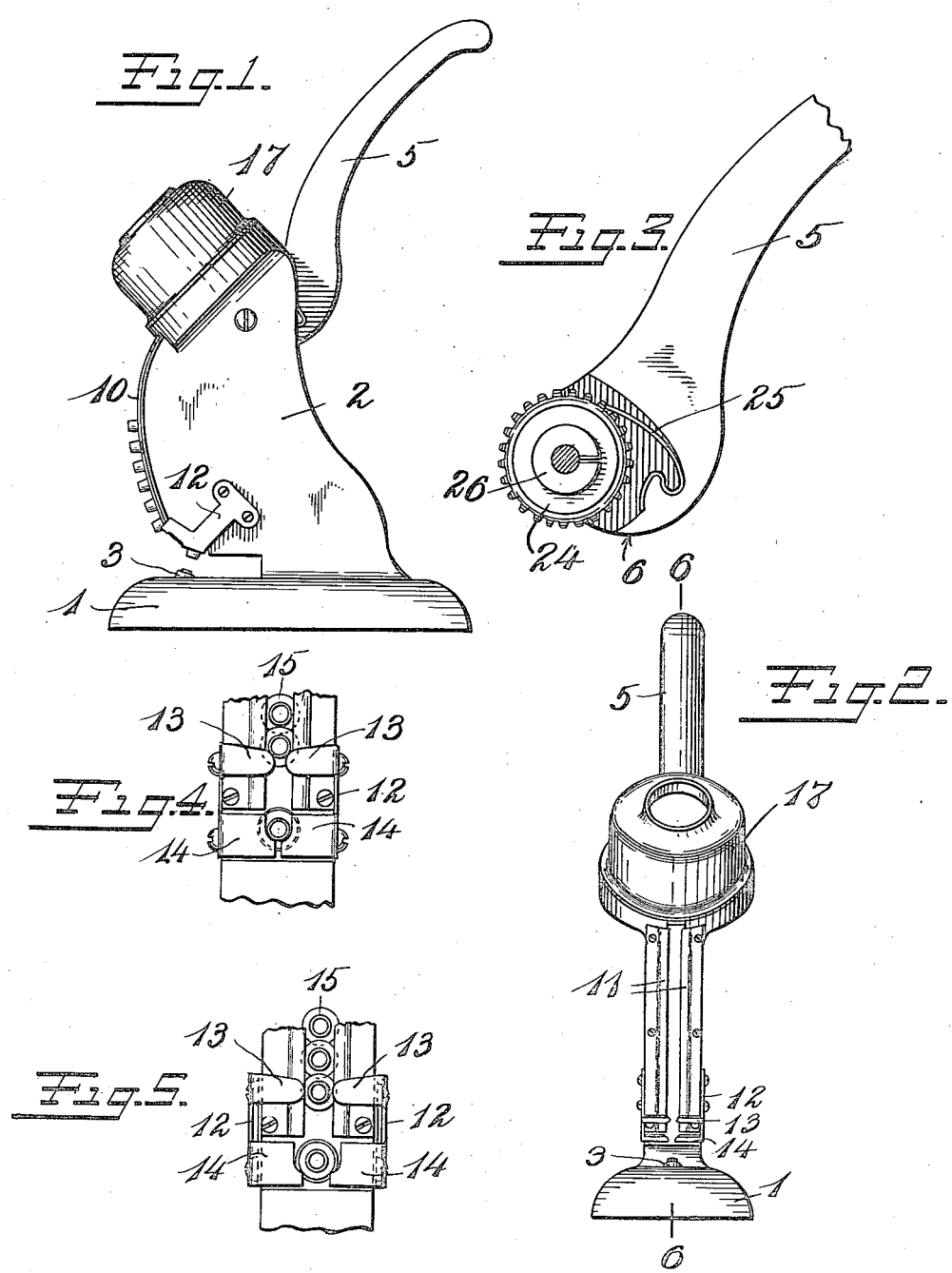

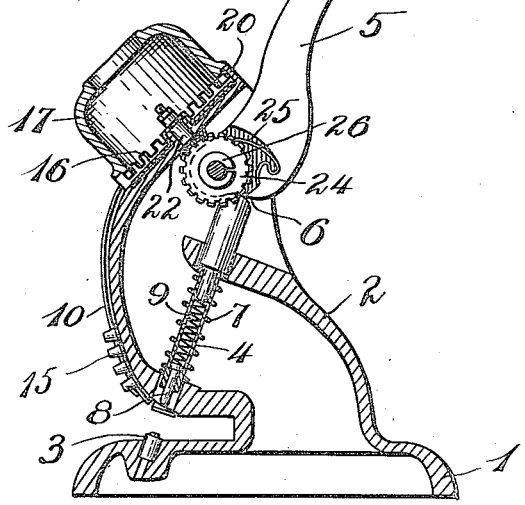
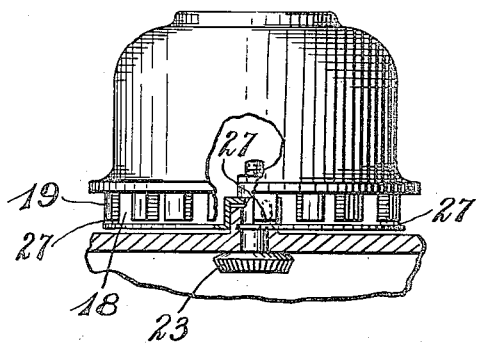
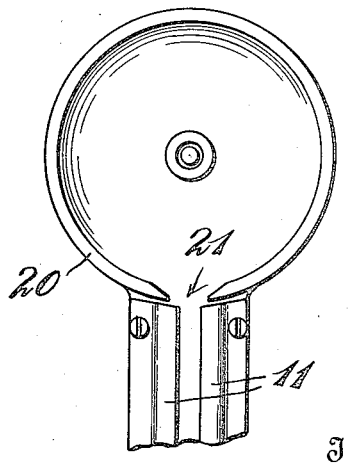

LOUIS MYERS, OF FLATBUSH, NEW YORK, ASSIGNOR TO MACHINE APPLIANCE CORPORATION, OF NEW YORK, N. Y., A CORPORATION OF NEW YORK.

EYELETING-MACHINE.

1,174,948. Specification of Letters Patent. Patented Mar. 7, 1916.

Application filed July 13, 1915. Serial No. 39,562.

*To all whom it may concern:*

Be it known that I, LOUIS MYERS, a citizen of the United States, residing at Flatbush, county of Kings, New York, have invented certain new and useful Improvements in Eyeleting-Machines, of which the following is a full, clear, and exact description.

My invention relates to improvements in eyeleting machines, and has for its object to provide a hand operated eyeleting machine in which the eyelets are automatically fed to the actuating plunger from a magazine.

It further has for its object to provide such a machine in which the eyelet acts to puncture the substance in which it is to be fastened.

It further has for its object to provide such a machine with a reservoir for supplying eyelets to the magazine.

It further has for its object to provide means whereby the operation of the handle causes eyelets to be supplied by the reservoir to the magazine.

It further has for its object to provide means for rotating the reservoir intermittently in one direction.

The following is a description of an embodiment of my invention, reference being had to the accompanying drawings, in which—

Figure 1 is a side elevation of the machine. Fig. 2 is a front elevation of the same. Fig. 3 is a detail showing the handle and parts carried thereby. Fig. 4 is a detail of a portion showing the releasing and restraining springs in one position. Fig. 5 is a detail showing the same in another position. Fig. 6 is a section of the machine on the line 6—6 Fig. 2. Fig. 7 is a side elevation of the reservoir and parts of the base in section. Fig. 8 is a detail showing the portion of the base to which the reservoir is applied.

Referring more particularly to the drawings: 1 is a base having an upright standard 2.

3 is an anvil in the base and 4 is an inclined plunger in the standard. Journaled in the standard is a handle 5 having a cam 6 acting on the upper end of the plunger 4. The plunger 4 is surrounded by a spring 7 which retracts the plunger and the handle. Within the lower end of the plunger is movable subsidiary plunger 8 which is normally held in extended position by a spring 9. On the front of the standard is a magazine 10 formed by two strips 11 secured in place by screws. At the bottom of the magazine are two retaining and releasing springs 12 each having a forward tooth 13 and a rear tooth 14. The teeth 13 and 14 normally stand in the path of the eyelets 15 in the magazine and the plunger 4 respectively. When the plunger 4 is lowered it engages the teeth 14 and spreads them and the teeth 13 apart so as to permit an eyelet in the magazine to pass the teeth 13 into the space between its lower edge and the depressed plunger which is sufficient to admit an eyelet. When the plunger is again raised that eyelet falls by gravity into a position below the plunger 4. In order to make this falling movement easy the plunger 4 is inclined so that its lower end is in front of its upper end. When the handle is actuated to depress the plunger 4 the subsidiary plunger enters the eyelet which is thereafter carried down toward the material into which the eyelet is to be inserted. Further movement of the plunger 4 forces the eyelet through the material, the subsidiary plunger being forced backward relatively so as to permit this action. After the eyelet has been forced through the material it is brought into engagement with the anvil which crimps its lower end so as to secure the eyelet in position.

In order to supply the magaine with eyelets I provide the reservoir which consists of an inclined plate 16 and a container 17 mounted so as to be revolvable about its axis. The axis has its upper end inclined forward and lies in the same plane as the axis of the plunger 4 and the magazine. The container 17 is provided with spaces 18 formed by teeth 19 through and beneath which the eyelets can pass when their flanges are in engagement with the plate 16. As they pass through these openings they enter a passage which is formed between the container and the flange 20 on the standard. This flange is provided with an opening 21 in line with the upper end of the magazine, through which the eyelets pass to the magazine. The reservoir can be moved by hand so as to feed the eyelets to the magazine.

In order to move the reservoir automatically when the machine is operated, I provide a shaft 22 secured to the plate 16 and provided with a beveled gear 23. With this gear circular rack or second beveled gear 24 carried by the handle engages so that when the handle is actuated the reservoir is caused to move about its axis. In order to permit the reservoir to be moved either by hand or automatically I provide a pawl 25 upon the handle which engages extremities of the teeth on the gear 24. If it is desired to have the reservoir move in one direction only I provide a friction washer 26 between the gear 24 and the inner face of the standard which holds the gear 24 against movement when the handle is being depressed. The plate 16 while spaced away from most of the teeth 19, is secured to certain of them by rivets 27.

The anvil 3 has a circular top whose edge just fits within the forward end of one of the eyelets 15. Below this edge the anvil is provided with a curved surface which receives the forward edge of the eyelet and turns or crimps it into the desired position.

The operation is as follows: Eyelets are placed in the reservoir and by it are fed to the magazines when moved by the handle or by hand. They are then fed past the springs 13 into a position in line with the plunger 4 and are by it forced down upon the anvil, passing through any suitable substance that may be placed between the anvil and plunger, and being crimped by the anvil. Upon the rising of the handle and plunger another eyelet, which has just been released by the teeth 13, falls into position in line with the plunger and the operation is repeated.

The inwardly extending portions 14 of the springs 12 not only support the eyelet in line with the axis of the plunger before the plunger is lowered but on the upstroke of the plunger they act to remove the eyelet from the plunger by engaging the upper surface of the eyelet. This assists in operation of the machine, particularly when the plunger is lowered without having paper inserted beneath it, in which case, except for the removing action above described, the crimped eyelet is liable to remain on the plunger, causing the machine to clog.

As will be evident to those skilled in the art, my invention permits of various modifications without departing from the spirit thereof or the scope of the appended claims.

What I claim is

1. In an eyeleting machine, the combination of a base and standard, an anvil, a plunger, a handle for actuating said plunger projecting toward the rear of the machine, a spring for retracting said plunger and handle, and a magazine for feeding eyelets to a position beneath said plunger and located in front of said plunger.

2. In an eyeleting machine, the combination of a base and standard, an anvil, a plunger, a handle for actuating said plunger and projecting toward the rear of said machine, means for retracting said plunger and handle, and a magazine for feeding eyelets to a position beneath said plunger and located in front of said plunger, said plunger and anvil having a common axis inclined to the vertical, the lower end of said axis pointing forward, said axis lying in the plane of the axis of the magazine.

3. In an eyeleting machine, the combination of a base and standard, an anvil, a plunger, a handle for actuating said plunger, means for retracting said plunger and handle, a magazine for feeding eyelets to a position beneath said plunger and spring actuated means having a portion lying in the path of the eyelets in said magazine and a portion lying in the path of said plunger, said portions being connected together and located on the same side of said magazine, the first mentioned portion being controlled by the plunger through the second mentioned portion.

4. In an eyeleting machine, the combination of a base and standard, an anvil, a plunger, a handle for actuating said plunger projecting toward the rear of said machine, a spring for retracting said plunger and handle, a magazine for feeding eyelets to a position beneath said plunger and located in front of said plunger, said plunger and anvil having a common axis, inclined to the vertical, said axis having its lower end pointing forward and lying in the plane of the axis of the magazine, and a revolvable reservoir located at the top of the magazine, having the upper end of its axis inclined forwardly.

5. In an eyeleting machine, the combination of a base and standard, an anvil, a plunger, a handle for actuating said plunger projecting toward the rear of said machine, a spring for retracting said plunger and handle, a magazine for feeding eyelets to a position beneath said plunger and located in front of said plunger, a reservoir located at the head of said magazine and means carried by said handle for causing eyelets to be delivered from said reservoir to said magazine, said plunger and anvil having a common axis inclined forwardly at its lower end, and lying in the same plane as the axis of the magazine.

6. In an eyeleting machine, the combination of a base and standard, an anvil, a plunger, a handle for actuating said plunger and projecting toward the rear of said machine, means for retracting said plunger and handle, a magazine for feeding eyelets to a position beneath said plunger and located in front of said plunger, and spring actuated escapement means having two connected portions located on the same side of said magazine, one portion lying in the path of said plunger, and the other lying in the path of the eyelets within said magazine and controlled by said plunger acting through said first mentioned portion, the space between the rear edge of said second portion and said plunger when depressed being sufficient to admit an eyelet.

7. In an eyeleting machine, the combination of a base and standard, an anvil, a plunger, a pivoted handle for actuating said plunger, a spring for retracting said plunger and handle, a magazine for feeding eyelets to a position beneath said plunger, a reservoir for supplying eyelets to said magazine and means for feeding eyelets from said reservoir comprising a gear revolving in a plane parallel to said reservoir and gear teeth carried by said handle and concentric with the pivot thereof so as to lie in a plane parallel to the plane in which said handle moves.

8. In an eyeleting machine, the combination of a base and standard, an anvil, a plunger, a pivoted handle for actuating said plunger, a spring for retracting said plunger and handle, a magazine for feeding eyelets to a position beneath said plunger, a reservoir for supplying eyelets to said magazine and means for feeding eyelets from said reservoir comprising a gear revolving in a plane parallel to said reservoir and a gear carried by said handle and concentric with the pivot thereof so as to lie in a plane parallel to the plane in which said handle moves and being movable independently of said handle, and a pawl carried by said handle and engaging said second gear.

9. In a magazine feed machine, the combination of a base and standard, a plunger, means for reciprocating said plunger, a magazine for feeding fasteners to a position beneath said plunger, a spring-actuated escapement means having two connected portions located on the same side of the magazine, one lying in the path of said plunger and the other lying in the path of the fasteners within said magazine and controlled by said plunger acting through said first mentioned portion, the space between the rear edge of said second portion and said plunger when depressed being sufficient to admit a fastener.

10. In an eyeleting machine adapted to force an eyelet through a number of layers of material and crimp the same with a single forward movement of said eyelet, the combination of a frame, a plunger provided with a yielding spring-extended eyelet-carrying projection and movably mounted in said frame, means for reciprocating said plunger, a stationary crimping anvil in line with said plunger and forming an abutment coöperating with the forward edge of said eyelet, yielding eyelet-supporting members having portions extending inward toward the axis of said plunger and adapted to support an eyelet in line with said plunger and to remove the eyelet from said plunger on the return stroke of said plunger by engaging the rear surface of said eyelet.

LOUIS MYERS.